No. 866,793. PATENTED SEPT. 24, 1907.
C. F. LANCASTER.
NUT HOLDING DEVICE.
APPLICATION FILED APR. 30, 1907.
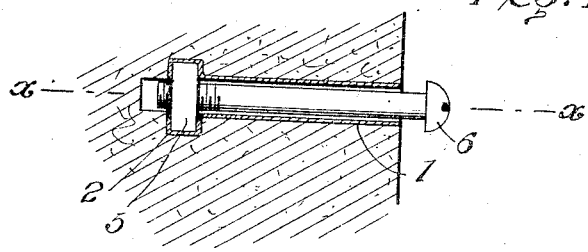
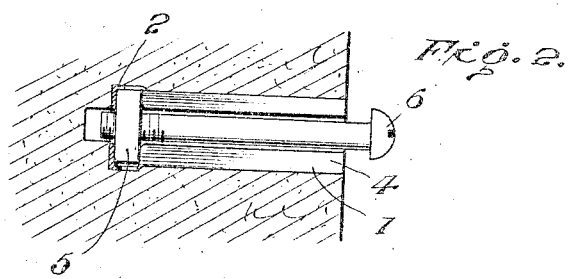
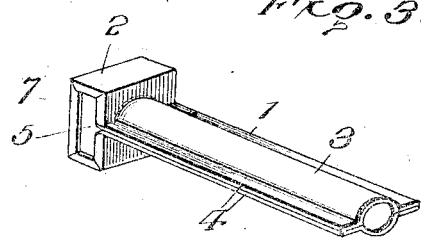
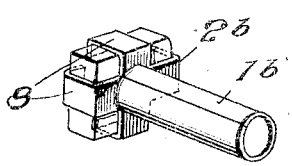
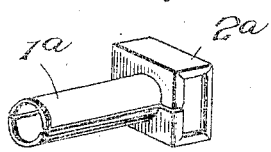
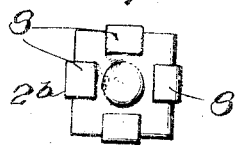
Witnesses
Inventor
C. F. Lancaster,
Attorneys

UNITED STATES PATENT OFFICE.

CHARLES F. LANCASTER, OF PETOSKEY, MICHIGAN.

NUT-HOLDING DEVICE.

No. 866,793.

Specification of Letters Patent.

Patented Sept. 24, 1907.

Application filed April 30, 1907. Serial No. 371,093.

*To all whom it may concern:*

Be it known that I, CHARLES F. LANCASTER, a citizen of the United States, residing at Petoskey, in the county of Emmet and State of Michigan, have invented certain new and useful Improvements in Nut-Holding Devices, of which the following is a specification.

This invention has for its object an improved device for holding an embedded or buried nut in position to always properly receive the bolt, and the invention consists in certain constructions, arrangements and combinations of the parts which I shall hereinafter fully describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a sectional view illustrating the application of my improved nut holding device; Fig. 2 is a similar view, the section being taken on the line $x$—$x$ of Fig. 1; Fig. 3 is a detail perspective view of a nut holder detached; Fig. 4 is a detail perspective view of a modification; Fig. 5 is an end view of a modified form illustrated in Fig. 4; and, Fig. 6 is a detail perspective view of another modification.

Corresponding and like parts are referred to in the following description and indicated in all the views of the drawings by the same reference characters.

My improved nut holding device comprises a sleeve or barrel 1 and a box or nut retaining portion 2. These are preferably formed as integral parts, of a single strip of sheet metal which is bent, in the manufacture, at an intermediate point, as at the middle to form the box 2, the ends being extended parallel with each other and being each formed with a longitudinal ridge 3, said two ridges together forming the bore of the sleeve. The metal on both sides of said ridges constitute wings 4 that are adapted to abut against each other. In the preferred manner of attaching the nut to the device of my invention, the said nut 5 is first inserted into the box 2 from either open side, the bolt 6 is then inserted into the sleeve 1 and screwed through the nut and back portion of the sleeve, and the edges of the thin metal forming the box are then crushed down over the nut, as indicated at 7, so as to securely hold the nut in place. The entire device with the nut in it is then inserted in place, being embedded in the desired part, with the end of the sleeve which is towards the head of the bolt, flush with the surface of the part in which the device is secured.

If desired, as illustrated in Fig. 6, the device may be constructed of a sleeve 1$^a$ and box 2$^a$, of which the former is devoid of the wings 4, the sleeve being entirely round, or, if desired, as illustrated in Fig. 4, the device may comprise a sleeve 1$^b$ and a box 2$^b$ of which the former is formed by rolling a strip of metal upon itself, one end being slit to form tongues 8 adapted to be bent over the sides of the nut as clearly illustrated in the drawing, to form the box. It is obvious that the device in some forms may be cast instead of being bent out of sheet metal.

From the foregoing description in connection with the accompanying drawing, it will be seen that I have provided a very simple, durable and efficient construction of device for holding a nut embedded in a position to always receive the bolt, as the nut is held square and in line with the sleeve or barrel. This device, for instance, will be found useful in concrete work where it is desired to bolt timbers to a concrete wall, after the wall has been finished. In such event, after the nut has been secured in the box, the sleeve is placed in the finished concrete with the end towards the head of the bolt flush with the surface of the wall. The device will also be found useful in connection with knock-down furniture or implements which employ an embedded nut, in fact under every condition in which it is essential that an embedded nut be held rigidly in a position to always receive a bolt.

Having thus described the invention, what is claimed as new is:

1. A device for holding an embedded nut, comprising an integral structure embodying a box, and a sleeve forming a bore and communicating with said box, in combination with the nut in said box, the box engaging the faces and sides of the nut and holding the same from either rotary or longitudinal movement while the bolt is applied thereto.

2. A device for holding an embedded nut, consisting of a strip of sheet metal bent at its middle to form a nut receiving box, the ends of said strip extending parallel and formed with longitudinal ridges, and wings on both sides of said ridges, the said ends together forming a sleeve in communication with the box.

In testimony whereof I affix my signature in presence of two witnesses.

CHARLES F. LANCASTER. [L. S.]

Witnesses:
R. C. AMES,
H. H. GOODWIN.